United States Patent
Mukasa et al.

(10) Patent No.: US 10,954,339 B2
(45) Date of Patent: Mar. 23, 2021

(54) POLYIMIDE RESIN COMPOSITION, METHOD FOR PRODUCING SAME, AND POLYIMIDE FILM

(71) Applicant: MITSUBISHI GAS CHEMICAL COMPANY, INC., Tokyo (JP)

(72) Inventors: Kazuaki Mukasa, Tokyo (JP); Yohei Abiko, Kanagawa (JP); Aoi Daito, Kanagawa (JP); Shinji Sekiguchi, Kanagawa (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 161 days.

(21) Appl. No.: 16/087,363

(22) PCT Filed: Mar. 31, 2017

(86) PCT No.: PCT/JP2017/013650
§ 371 (c)(1),
(2) Date: Sep. 21, 2018

(87) PCT Pub. No.: WO2017/175679
PCT Pub. Date: Oct. 12, 2017

(65) Prior Publication Data
US 2020/0002477 A1     Jan. 2, 2020

(30) Foreign Application Priority Data
Apr. 5, 2016 (JP) .............................. JP2016-076194

(51) Int. Cl.
*C08K 3/22* (2006.01)
*C08J 5/18* (2006.01)
*C08G 73/10* (2006.01)
*C08J 3/215* (2006.01)

(52) U.S. Cl.
CPC ..... *C08G 73/1078* (2013.01); *C08G 73/1021* (2013.01); *C08G 73/1032* (2013.01); *C08J 3/215* (2013.01); *C08J 5/18* (2013.01); *C08K 3/22* (2013.01); *C08J 2379/08* (2013.01); *C08K 2003/2241* (2013.01)

(58) Field of Classification Search
CPC .... C08G 73/10; C08J 2/15; C08J 5/18; C08K 3/22
USPC ........................................................ 524/600
See application file for complete search history.

(56) References Cited

U.S. PATENT DOCUMENTS

| 2010/0187719 A1 | 7/2010 | Oishi et al. |
| 2014/0114000 A1* | 4/2014 | Makinoshima ............ C08J 5/18 524/116 |
| 2014/0378588 A1 | 12/2014 | Liang |
| 2016/0222165 A1 | 8/2016 | Wakita et al. |

FOREIGN PATENT DOCUMENTS

| CN | 101831175 | | 9/2010 |
| CN | 105111475 | | 12/2015 |
| EP | 1975192 | A1 | 10/2008 |
| JP | 61-291650 | A | 12/1986 |
| JP | 4-13763 | A | 1/1992 |
| JP | 2009-51891 | A | 3/2009 |
| JP | 4749200 | B2 | 8/2011 |
| JP | 2012-167169 | * | 9/2012 |
| JP | 2012-167169 | A | 9/2012 |
| JP | 2016-75894 | A | 5/2016 |
| TW | 201134878 | A | 10/2011 |
| TW | 201522421 | A | 6/2015 |
| TW | 201600563 | A | 1/2016 |
| WO | 2008/146637 | A1 | 12/2008 |

OTHER PUBLICATIONS

International Search Report in International Patent Application No. PCT/JP2017/013650, dated Jun. 20, 2017.
International Preliminary Report on Patentability in International Patent Application No. PCT/JP2017/013650 dated Oct. 9, 2018.

* cited by examiner

*Primary Examiner* — Deve V Hall
(74) *Attorney, Agent, or Firm* — Greenblum & Bernstein, P.L.C.

(57) ABSTRACT

Provided is a polyimide resin composition and a production method thereof, wherein the polyimide resin composition contains an alicyclic polyimide resin having a structural unit represented by the following general formula (1) and inorganic particles of at least one selected from the group consisting of titanium dioxide, barium titanate, and zirconium oxide, wherein the alicyclic polyimide resin has a glass transition temperature of 260° C. or higher,

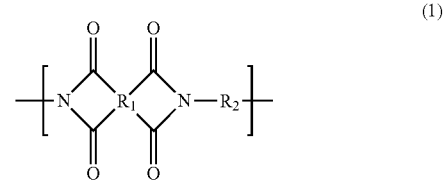

(1)

wherein $R_1$ represents a tetravalent alicyclic hydrocarbon group having a carbon number of from 4 to 22, and $R_2$ represents a divalent aliphatic hydrocarbon group having a carbon number of from 2 to 28 and/or a divalent aromatic hydrocarbon group having a carbon number of from 6 to 27.

8 Claims, No Drawings

POLYIMIDE RESIN COMPOSITION, METHOD FOR PRODUCING SAME, AND POLYIMIDE FILM

TECHNICAL FIELD

The present invention relates to a polyimide resin composition, a method for producing the same, and a polyimide film.

BACKGROUND ART

In general, polyimide resins are obtained from an aromatic tetracarboxylic anhydride and an aromatic diamine, and have excellent heat resistance, chemical resistance, mechanical characteristics and electric characteristics, due to molecular stiffness, resonance stabilization and strong chemical bond. Therefore, polyimide resins are widely used in the fields of molding materials, composite materials, electric and electronic components, optical materials, displays, and the like.

Titanium dioxide powders have white color and a high hiding power, and therefore titanium oxide powders are used as a white pigment and are widely used in the fields of coating materials, printing materials, cosmetics, and the like. For the crystal system of titanium dioxide, there are three forms, i.e., an anatase type, a rutile type, and a perovskite type.

Titanium dioxide becomes able to prevent light scattering in a visible ray region by being made into fine particles. Titanium dioxide fine particles are colorless and transparent, and exhibit an effect of shielding and absorbing ultraviolet rays. For this reason, titanium dioxide fine particles are used by being blended in sunscreen cosmetics, ultraviolet ray blocking agents, ultraviolet ray blocking films, reflection preventing films, and the like. Anatase type titanium dioxide fine particles have a high photo-catalytic effect of absorbing ultraviolet rays and decomposing ambient organic substances, and thus are practically used as a material for self-cleaning technique for residential walls or a deodorant function material.

By utilizing a high refractive index property of titanium dioxide, a high refractive material obtained by combining titanium dioxide with a resin material and the like is proposed. For example, PTL 1 discloses a composition obtained by combining inorganic particles having a refractive index of 1.6 or greater with a transparent resin such as an acrylic resin, polyester resin, an epoxy resin, and a polycarbonate resin, PTL 2 discloses a high refractive high transparent heat resistant optical material made of an aromatic polyimide and an inorganic oxide, and PTL 3 discloses a resin for an optical material, which is obtained by covering titanium dioxide with a silicon oxide-containing material.

CITATION LIST

Patent Literature

PTL 1: JP-A-61-291650
PTL 2: JP-A-4-13763
PTL 3: Japanese Patent No. 4749200

SUMMARY OF INVENTION

Technical Problem

In recent years, a heat resistant high refractive material that does not lose transparency in a high temperature mounting process such as metal sputtering or soldering has been required. The materials disclosed in PTLs 1 to 3 are acknowledged to have an effect of obtaining a high refractive index, but are not sufficient as a material having transparency, heat resistance and high refractive index all at once.

In view of the above-described circumstance, an object of the present invention is to solve the problems that the related art has, and to provide a polyimide resin composition capable of forming a polyimide resin film having a high refractive index, transparency and heat resistance, and a method for producing the same.

Solution to Problem

As a result of intensive examination for achieving the above object, the present inventors have found that the above-mentioned problems can be solved by a polyimide resin composition that contains an alicyclic polyimide resin having a specific structural unit and a predetermined inorganic particle such as titanium dioxide, thereby completing the present invention.

That is, the present invention relates to the following [1] to [3]:

[1] A polyimide resin composition containing an alicyclic polyimide resin having a structural unit represented by the following general formula (1) and inorganic particles of at least one selected from the group consisting of titanium dioxide, barium titanate, and zirconium oxide, wherein the alicyclic polyimide resin has a glass transition temperature of 260° C. or higher,

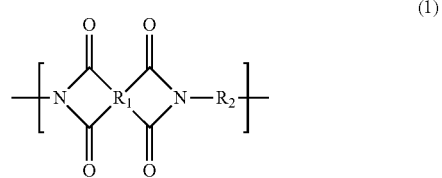

wherein $R_1$ represents a tetravalent alicyclic hydrocarbon group having a carbon number of from 4 to 22, and $R_2$ represents a divalent aliphatic hydrocarbon group having a carbon number of from 2 to 28 and/or a divalent aromatic hydrocarbon group having a carbon number of from 6 to 27.

[2] A method for producing a polyimide resin composition, including mixing a polyimide resin solution containing an alicyclic polyimide resin having a structural unit represented by the following general formula (1) with an inorganic particle dispersion containing inorganic particles of at least one selected from the group consisting of titanium dioxide, barium titanate, and zirconium oxide, wherein the inorganic particle dispersion has a solid content concentration of 10 to 50 mass %,

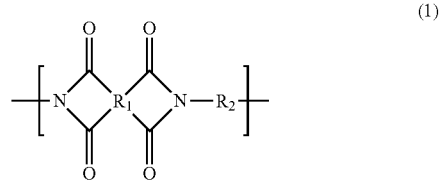

wherein R₁ represents a tetravalent alicyclic hydrocarbon group having a carbon number of from 4 to 22, and R₂ represents a divalent aliphatic hydrocarbon group having a carbon number of from 2 to 28 and/or a divalent aromatic hydrocarbon group having a carbon number of from 6 to 27.

[3] A polyimide film, composed of a cured product of the above polyimide resin composition.

Advantageous Effects of Invention

According to the present invention, it is possible to provide a polyimide resin composition capable of forming a polyimide resin film having a high refractive index, transparency, and heat resistance, and to provide a method for producing the same.

DESCRIPTION OF EMBODIMENTS

[1. Polyimide Resin Composition]

The polyimide resin composition of the present invention is a polyimide resin composition containing an alicyclic polyimide resin having a structural unit represented by the following general formula (1) and inorganic particles of at least one selected from the group consisting of titanium dioxide, barium titanate, and zirconium oxide, wherein the alicyclic polyimide resin has a glass transition temperature of 260° C. or higher.

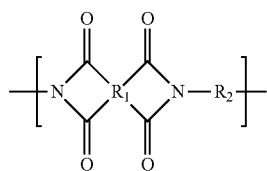

(1)

The above alicyclic polyimide resin has a repeating unit represented by the above general formula (1), and in the formula (1), R₁ represents a tetravalent alicyclic hydrocarbon group having a carbon number of from 4 to 22, and R₂ represents a divalent aliphatic hydrocarbon group having a carbon number of from 2 to 28 and/or a divalent aromatic hydrocarbon group having a carbon number of from 6 to 27. Here, the "alicyclic hydrocarbon group" means a group having an alicyclic hydrocarbon structure.

Owing to R₁ that contains an alicyclic hydrocarbon structure, the polyimide resin used in the present invention is especially excellent in transparency and heat resistance. The alicyclic hydrocarbon structure may be saturated or may be unsaturated, but from the viewpoint of transparency, a saturated alicyclic hydrocarbon structure is preferable.

R₁ in the general formula (1) has at least one alicyclic hydrocarbon structure. The carbon number of R₁ is 4 to 22, preferably 4 to 18, and more preferably 6 to 16.

Examples of the alicyclic hydrocarbon structure include a cycloalkane ring such as a cyclobutane ring, a cyclopentane ring, and a cyclohexane ring; a cycloalkene ring such as a cyclohexene ring; a bicycloalkane ring such as a norbornane ring; and a bicycloalkene ring such as norbornene. Of these, preferred are a cycloalkane ring and a bicycloalkane ring, more preferred are a cycloalkane ring and a bicycloalkane ring having a ring-membered carbon number of from 4 to 6, even more preferred are a cyclohexane ring and a bicyclohexane ring, and still more preferred is a cyclohexane ring.

From the viewpoint of the transparency of the polyimide resin, R₁ is preferably composed of an alicyclic hydrocarbon structure alone.

The alicyclic polyimide resin having a repeating unit represented by the general formula (1) is, as described later, obtained by reacting an alicyclic tetracarboxylic acid containing a tetravalent alicyclic hydrocarbon group having a carbon number of from 4 to 22 or a derivative thereof with an aliphatic diamine containing a divalent aliphatic hydrocarbon group having a carbon number of from 2 to 28 and/or an aromatic diamine containing a divalent aromatic hydrocarbon group having a carbon number of from 6 to 27 in a specific organic solvent.

Examples of the alicyclic tetracarboxylic acid containing a tetravalent alicyclic hydrocarbon group having a carbon number of from 4 to 22 include 1,2,3,4-cyclobutanetetracarboxylic acid, 1,2,4,5-cyclopentanetetracarboxylic acid, 1,2,4,5-cyclohexanetetracarboxylic acid, bicyclo[2.2.2]octa-7-en-2,3,5,6-tetracarboxylic acid, dicyclohexyltetracarboxylic acid, and regioisomers thereof.

Examples of a derivative of a tetracarboxylic acid containing a tetravalent alicyclic hydrocarbon group having a carbon number of from 4 to 22 include an anhydride or an alkyl ester of the tetracarboxylic acid. The tetracarboxylic acid derivative preferably has a carbon number of from 8 to 38. Examples of the anhydride of the tetracarboxylic acid having an alicyclic hydrocarbon structure include 1,2,3,4-cyclobutanetetracarboxylic dianhydride, 1,2,4,5-cyclopentanetetracarboxylic dianhydride, 1,2,4,5-cyclohexanetetracarboxylic dianhydride, bicyclo[2.2.2.]octa-7-en-2,3,5,6-tetracarboxylic dianhydride, dicyclohexyltetracarboxylic dianhydride and regioisomers thereof.

The alkylester of a tetracarboxylic acid containing a tetravalent alicyclic hydrocarbon group having a carbon number of from 4 to 22, preferably has alkyl having a carbon number of from 1 to 3, and examples thereof include a dimethyl ester, a diethyl ester, and a dipropyl ester of a tetracarboxylic acid containing the above-described alicyclic hydrocarbon structure.

As a tetracarboxylic acid containing a tetravalent alicyclic hydrocarbon group having a carbon number of from 4 to 22 or a derivative thereof, at least one compound selected from the above may be used alone, or may be used in combination of two or more.

Among tetracarboxylic acid components having an alicyclic hydrocarbon structure, preferred are a cycloalkanetetracarboxylic acid, a bicycloalkanetetracarboxylic acid, and acid dianhydrides thereof, more preferred are a cycloalkanetetracarboxylic acid having a ring-membered carbon number of from 4 to 6, a bicycloalkanetetracarboxylic acid having a ring-membered carbon number of from 4 to 6, and acid dianhydrides thereof, and further more preferred are 1,2,4,5-cyclohexanetetracarboxylic acid and an acid dianhydride thereof.

Examples of the aliphatic diamine containing a divalent aliphatic hydrocarbon group having a carbon number of from 2 to 28 represented by R₂ include 4,4-diaminodicyclohexyl methane, isophoronediamine, ethylenediamine, tetramethylenediamine, norbornane diamine, 1,3-bis(aminomethyl)cyclohexane, 1,3-diaminocyclohexane, 1,4-diaminocyclohexane, hexamethylenediamine, 2,5-dimethylhexamethylenediamine, trimethylhexamethylenediamine, polyethylene glycol bis(3-aminopropyl) ether, polypropylene glycol bis(3-aminopropyl) ether, 1,3,5-tris(aminomethyl)benzene, 4,4-methylenebis(cyclohexylamine), bicyclohexyldiamine, and siloxane diamines. These diamines may be used alone, or in mixture of two or more. Of these, from the viewpoint of easily obtaining high molecular weight and excellent heat resistance, diamines having an alicyclic structure such as 4,4-diaminodicyclohexyl methane, isophoronediamine, and 1,3-diaminocyclohexane are preferably used. These diamines may be used alone, or in mixture of two or more.

Examples of the aromatic diamines containing a divalent aromatic hydrocarbon group having a carbon number of from 6 to 27 represented by $R_2$ include 1,4-bis(4-amino-α,α-dimethylbenzyl)benzene, 4,4'-bis(4-aminophenoxy)biphenyl, 5-amino-1,3,3-trimethyl-1-(4-aminophenyl)-indane, 6-amino-1,3,3-trimethyl-1-(4-aminophenyl)-indane, 2,2'-dimethylbenzidine, 2,2'-bis(trifluoromethyl)benzidine, paraxilylenediamine, methaxilylenediamine, 4,4'-diaminodiphenylether, 3,4'-diaminodiphenylether, 4,4'-diaminodiphenylmethane, 1,3-phenylenediamine, 1,4-phenylenediamine, 4,4'-diamino-3,3'-dimethylbiphenyl, 4,4'-diamino-2,2'-dimethylbiphenyl, 4,4'-diamino-2,2'-dimethoxybiphenyl, 4,4'-diamino-2,2'-bis(trifluoromethyl)biphenyl, 4,4'-diaminodiphenyl sulfide, 4,4'-diaminodiphenyl sulfone, 4,4'-diaminobenzophenone, 9,9-bis(4-aminophenyl)fluorene, 1,1-bis[4-(4-aminophenoxy)phenyl]cyclohexane, 2,2-bis(3-aminophenyl)propane, 2,2-bis(4-aminophenyl)propane, 2,2,-bis[4-(4-aminophenoxy)phenyl]propane, 2,2-bis[4-(4-aminophenoxy)phenyl]-1,1,1,3,3,3,-hexafluoropropane, 1,3-bis(3-amino-α,α-dimethylbenzyl)benzene, 1,3-bis(4-amino-α,α-dimethylbenzyl)benzene, 1,4-bis(3-amino-α,α-dimethylbenzyl)benzene, 1,4-bis(3-aminophenoxy)benzene, 1,4-bis(4-aminophenoxy)benzene, 1,3-bis(3-aminophenoxy)benzene, 1,3-bis(4-aminophenoxy)benzene, 4,4'-bis(3-aminophenoxy)biphenyl, bis[4-(3-aminophenoxy)phenyl]ketone, bis[4-(4-aminophenoxy)phenyl]ketone, bis[4-(3-aminophenoxy)phenyl]sulfide, bis[4-(4-aminophenoxy)phenyl]ulfide, bis[4-(3-aminophenoxy)phenyl]ether, bis[4-(4-aminophenoxy)phenyl]ether, bis[4-(3-aminophenoxy)phenyl]sulfone, and bis[4-(4-aminophenoxy)phenyl]sulfone. These diamines can be used alone, or in mixture of two or more.

With respect to 5-amino-1,3,3-trimethyl-1-(4-aminophenyl)-indane (hereinafter, referred to as "5-amino body") and 6-amino-1,3,3-trimethyl-1-(4-aminophenyl)-indane (hereinafter, referred to as "6-amino body"), there is a case where these isomers are mixed. That is, in the case where amino-1,3,3-trimethyl-1-(4-aminophenyl)-indane is used, the 5-amino body and the 6-amino body may be mixed.

Of these, from the viewpoint of easily obtaining high molecular weight and excellent heat resistance, 1,4-bis(4-amino-α,α-dimethylbenzyl)benzene, 4,4'-bis(4-aminophenoxy)biphenyl, 9,9-bis(4-aminophenyl)fluorene, 4,4'-diaminodiphenylether, 4,4'-diamino-2,2'-dimethoxybiphenyl, and 4,4'-diamino-2,2'-bis(trifluoromethyl)biphenyl are preferably used.

From the viewpoint of a high refractive index and excellent heat resistance, 1,4-bis(4-amino-α,α-dimethylbenzyl)benzene, 4,4'-bis(4-aminophenoxy)biphenyl, 5-amino-1,3,3-trimethyl-1-(4-aminophenyl)-indane, 6-amino-1,3,3-trimethyl-1-(4-aminophenyl)-indane, 2,2'-dimethylbenzidine, and 2,2'-bis(trifluoromethyl)benzidine are preferably used, 1,4,-bis(4-amino-α,α-dimethylbenzyl)benzene, 4,4'-bis(4-aminophenoxy)biphenyl, and 2,2'-dimethylbenzidine are more preferably used, and 4,4'-bis(4-aminophenoxy)biphenyl is further more preferably used.

As the alicyclic polyimide resin contained in the polyimide resin composition of the present invention, a polyimide resin having a repeating unit represented by the general formula (2) is particularly preferable.

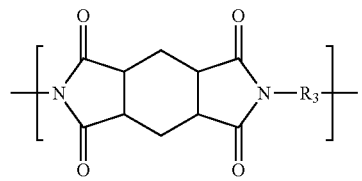

(2)

In the general formula (2), $R_3$ represents a divalent aliphatic hydrocarbon group having a carbon number of from 2 to 28 and/or a divalent aromatic hydrocarbon group having a carbon number of from 6 to 27. $R_3$ is the same as $R_2$ in the general formula (1), and preference with respect to $R_3$ is also the same as the preference described with respect to $R_2$ in the general formula (1).

In addition, the alicyclic polyimide resin contained in the polyimide resin composition of the present invention has a glass transition temperature of 260° C. or higher from the viewpoint of practical heat resistance for intended use. If the glass transition temperature is lower than 260° C., the heat resistance as the polyimide resin composition may be deteriorated. A preferred range of the glass transition temperature is from 260° C. to 420° C.

The polyimide resin composition of the present invention contains inorganic particles of at least one selected from the group consisting of titanium dioxide, barium titanate, and zirconium oxide. Since these inorganic particles have a high refractive index, it is possible to heighten the refractive index of a polyimide film to be formed.

The average primary particle diameter of the inorganic particles is preferably 0.005 to 0.1 μm, and more preferably 0.005 to 0.05 μm. If the average primary particle diameter is 0.005 μm or greater, productivity is high and practical yield can be obtained. If the average primary particle diameter is 0.1 μm or less, it is possible to prevent white turbidity of the polyimide resin composition and to achieve favorable transparency of a polyimide film obtained from the polyimide resin composition.

In the case where the average primary particle diameter of the inorganic particles is 0.005 to 0.1 μm, an average secondary particle diameter (D50) is preferably 0.005 to 0.15 μm, more preferably 0.005 to 0.1 μm, and further more preferably 0.005 to 0.05 μm.

As the inorganic particles contained in the polyimide resin composition of the present invention, titanium dioxide is preferable among titanium dioxide, barium titanate, and zirconium oxide, because titanium dioxide has the highest refractive index. Titanium dioxide may be amorphous or crystalline. However, it is preferable to use crystalline titanium dioxide as an effective selection for obtaining a high refractive index. For the crystalline system, there are three forms, i.e., an anatase type, a rutile type, and a perovskite type, and of these, the anatase type and the rutile type are preferable.

The average primary particle diameter of titanium dioxide is preferably 0.005 to 0.1 μm, and more preferably 0.005 to 0.05 μm. If the average primary particle diameter is 0.005 μm or greater, productivity is high and practical yield is obtained. If the average primary particle diameter is 0.1 μm or less, it is possible to prevent white turbidity of the polyimide resin composition and to achieve favorable transparency of a polyimide film obtained from the polyimide resin composition.

In the case where the average primary particle diameter is 0.005 to 0.1 μm, the average secondary particle diameter (D50) is preferably 0.005 to 0.15 µm, more preferably 0.005 to 0.1 µm, and further more preferably 0.005 to 0.05 µm.

In the present invention, regarding the average primary particle diameter and the average secondary particle diameter (D50), the average primary particle diameter can be measured with an electron microscope such as TEM and the average secondary particle diameter (D50) can be measured with a microtrack grain size distribution measurement device "9320-HRA" (manufactured by Nikkiso Co., Ltd.).

The polyimide resin composition of the present invention preferably contains 2 to 60 mass % of an alicyclic polyimide resin having a structural unit represented by the general formula (1), more preferably contains 3 to 45 mass % thereof, and further more preferably contains 4 to 8 mass % thereof.

The polyimide resin composition of the present invention preferably contains 2 to 80 mass % of inorganic particles of at least one selected from the group consisting of titanium dioxide, barium titanate, and zirconium oxide, more preferably contains 3 to 65 mass % thereof, and further more preferably contains 7 to 12 mass % thereof.

In addition, a proportion of the inorganic particles with respect to a total amount of the alicyclic polyimide resin and the inorganic particles is preferably 40 to 80 mass %, more preferably 50 to 70 mass %, and further more preferably 55 to 65 mass %, from the viewpoint of a refractive index.

The polyimide resin composition of the present invention may contain various additives as long as the effects of the present invention are not impaired, besides the above-mentioned alicyclic polyimide resin and the above-mentioned inorganic particles. Examples of the additives include an organic solvent, an antioxidant, a light stabilizer, a surfactant, a flame retardant, a plasticizer, a polyimide resin other than the above alicyclic polyimide resin, a polyamide resin, and a polyamideimide.

Specific examples of organic solvents that may be contained in the polyimide resin composition of the present invention include a solvent for a polyimide resin solution to be described later and a dispersion medium for an inorganic particle dispersion to be described later.

[2. Method for Producing Polyimide Resin Composition]

The method for producing a polyimide resin composition of the present invention includes mixing a polyimide resin solution containing the above-mentioned alicyclic polyimide resin having a structural unit represented by the general formula (1) (hereinafter, referred to as "polyimide resin solution (X)" in some cases) with an inorganic particle dispersion containing inorganic particles of at least one selected from the group consisting of titanium dioxide, barium titanate, and zirconium oxide (hereinafter, referred to as "inorganic particle dispersion (Y)" in some cases). As the inorganic particle dispersion (Y), a dispersion having a solid content concentration of 10 to 50 mass % is used.

The structure and the glass transition temperature of the alicyclic polyimide resin contained in the polyimide resin solution (X) are as described in the above [1. Polyimide Resin Composition].

Here, the alicyclic polyimide resin is synthesized by performing dehydration imidization reaction between an alicyclic tetracarboxylic acid or a derivative thereof and a diamine in an organic solvent, and in this manner, a solution of the alicyclic polyimide resin is produced. Specific examples of the method for producing an alicyclic polyimide resin solution include a method of obtaining a solution of an alicyclic polyimide resin by adding an alicyclic tetracarboxylic acid or a derivative thereof, and an imidization catalyst depending on the necessity, to a solution of an organic solvent where a diamine is dissolved in a temperature range of 30° C. to 90° C., and maintaining the temperature in a range of 30° C. to 90° C. to thereby obtain a polyamide acid solution, and adding an imidization catalyst thereto to perform dehydration imidization reaction while distilling produced water out of the system.

In the dehydration imidization reaction, a known imidization catalyst can be used. Examples of the imidization catalyst include base catalysts and acid catalysts. Specifically, tertiary amines such as triethylamine, tripropylamine, tributylamine, pyridine, quinoline, isoquinoline, α-picoline, β-picoline, N,N-dimethylaniline, and N,N-diethylaniline and acids such as crotonic acid, benzoic acid, methylbenzoic acid, oxybenzoic acid, benzenesulfonic acid, and para-toluenesulfonic acid can be used, and tertiary amines are preferably used. The imidization catalyst may be added before adding the alicyclic tetracarboxylic acid or a derivative thereof, and in this case, it is possible to immediately start heating to perform dehydration imidization reaction without maintaining the temperature at around room temperature or lower which is generally a reaction condition of forming a polyamide acid. The appropriate molar ratio of the imidization catalyst to the diamine (imidization catalyst/diamine) is preferably in a range of 0.01 to 1.0, and particularly preferably in a range of 0.05 to 0.5. If the molar ratio of the imidization catalyst to the diamine is 0.01 or greater, favorable catalyst action is exhibited and imidization reaction is promoted. If the molar ratio is 1.0 or less, the imidization catalyst itself is easily removed, coloring in the post-process is suppressed, and the solubility of the alicyclic polyimide resin solution is not affected.

The molar ratio of the diamine to the alicyclic tetracarboxylic acid or the derivative (diamine/alicyclic tetracarboxylic acid or derivative thereof) used in the synthesis of the alicyclic polyimide resin is preferably in a range of 0.95 to 1.05, and particularly preferably in a range of 0.99 to 1.01. With the molar ratio of diamine to the alicyclic tetracarboxylic acid or a derivative thereof being in the range of 0.95 to 1.05, it is possible to prevent the molecular weight from being low and thereby prevent a film from being brittle when the film is formed in the post-process.

In the dehydration imidization reaction in the synthesis of the alicyclic polyimide resin, a distillate containing water as a main component is removed out of the reaction system by a steam cooling tower mounted on an upper portion of a reaction tank and a distillate storage device combined therewith. The reaction temperature is generally in a range of 160° C. to 200° C., preferably in a range of 170° C. to 190° C., and further more preferably in a range of 180° C. to 190° C. If the reaction temperature is 160° C. or higher, imidization and increase in molecular weight are sufficiently proceeded, and if the reaction temperature is 200° C. or lower, solution viscosity can be maintained favorable. In some cases, an azeotropic dehydration agent such as toluene and xylene may be used. The reaction pressure is generally a normal pressure, but it is possible to perform reaction even under pressurization depending on the necessity. As the retention time of the reaction temperature, at least 1 hour is required, and 3 hours or more are preferable. If the retention time is 1 hour or more, imidization and increase in molecular weight can be sufficiently proceeded. The upper limit of the reaction time is not particularly limited, but reaction is generally performed in a range of 3 to 10 hours.

As an organic solvent used in synthesizing the alicyclic polyimide resin, a solvent containing at least one structure selected from the group consisting of a cyclic ether, a cyclic ketone, a cyclic ester, an amide, and a urea is preferable.

Although the organic solvent is not particularly limited, as a specific example, a solvent containing at least one selected from aprotic polar organic solvents such as N-methyl-2-pyrrolidone, N,N-dimethylacetamide (DMAc), γ-butyrolactone, N,N-dimethylformamide, dimethyl sulfoxide, hexamethylphosphoramide, tetramethylene sulfone, p-chlorophenol, m-cresol, 2-chloro-4-hydroxytoluene, and 1,3-dioxolane is preferable. Of these, one or more selected from the group consisting of N-methyl-2-pyrrolidone, N,N-dimethylacetamide, γ-butyrolactone, and N,N-dimethylformamide is more preferable.

The solid content concentration of the alicyclic polyimide resin with respect to the total mass including the organic solvent in the synthesis process of the alicyclic polyimide resin is preferably 20 mass % to 50 mass %, and more preferably 30 mass % to 40 mass %. If the solid content concentration is 20 mass % or greater, the intrinsic viscosity of the alicyclic polyimide resin is increased, increase in a high molecular weight is sufficiently proceeded, and it is possible to prevent a film from being brittle when the film is formed in the post-process. In addition, if the solid content concentration is 50 mass % or less, the viscosity of the alicyclic polyimide resin solution is not significantly increased, and stirring is easily performed uniformly. As a temperature of dissolving the solution in the organic solvent, the temperature is preferably at least 20° C., and more preferably in a range of 30° C. to 100° C. If the temperature is 20° C. or higher, the solvent viscosity is appropriate, and the solvent is easily handled.

The alicyclic polyimide resin solution produced in the above-described manner may be used as the polyimide resin solution (X) as it is without being diluted, or may be diluted by adding an organic solvent and then used as the polyimide resin solution (X). That is, the alicyclic polyimide resin solution may be mixed with an inorganic particle dispersion as it is without being diluted, or may be mixed with an inorganic particle dispersion after diluting the alicyclic polyimide resin solution by adding an organic solvent thereto. As the organic solvent added to the alicyclic polyimide resin solution, the same organic solvent as the organic solvent used at the time of synthesis of the alicyclic polyimide resin is exemplified.

Therefore, the solvent of the polyimide resin solution (X) contains an organic solvent used at the time of synthesis of the alicyclic polyimide resin, and an organic solvent added to the alicyclic polyimide resin solution if necessary.

The solid content concentration of the polyimide resin solution (X) is preferably 10 to 20 mass %, and more preferably 10 to 15 mass %, from the viewpoint of stability after mixing the inorganic fine particles.

In the present invention, the inorganic particle dispersion (Y) contains inorganic particles of at least one selected from the group consisting of titanium dioxide, barium titanate, and zirconium oxide.

The solid content concentration of the inorganic particle dispersion (Y) is 10 to 50 mass %, preferably 10 to 40 mass %, more preferably 10 to 30 mass %, and further more preferably 10 to 20 mass %. If the solid content concentration is less than 10 mass %, productivity is lowered. If the solid content concentration is greater than 50 mass %, dispersion becomes difficult and precipitation easily occurs.

In the present invention, a dispersion medium for the inorganic particle dispersion (Y) preferably has favorable compatibility with the solvent of the polyimide resin solution (X). As such a dispersion medium, N,N-dimethylacetamide, N,N-dimethylformamide, N,N,2-trimethylpropionamide, γ-butyrolactone (GBL), dimethyl sulfoxide, cyclopentanone, propylene glycol monomethyl ether, and propylene glycol monomethyl ether acetate are exemplified, and the inorganic particle dispersion (Y) preferably contains any one selected from these dispersion media. In addition, a proportion of the dispersion medium in the inorganic particle dispersion (Y) is preferably 50 mass % or greater, more preferably 60 mass % or greater, further more preferably 70 mass % or greater, and particularly preferably 80 mass % or greater.

As the inorganic particles contained in the inorganic particle dispersion (Y), titanium dioxide is preferable among titanium dioxide, barium titanate, and zirconium oxide, because titanium dioxide has the highest refractive index. The suitable form of the titanium dioxide is as described in the above [1. Polyimide Resin Composition].

Examples of a titanium source of the titanium dioxide include titanium dioxide powders, titanium alkoxide, titanium acetyl acetate, titanium tetrachloride, and titanium sulfate.

The solid content concentration of a titanium dioxide dispersion is 10 to 50 mass %, preferably 10 to 40 mass %, more preferably 10 to 30 mass %, and further more preferably 10 to 20 mass %. If the solid content concentration is less than 10 mass %, productivity is lowered. If the solid content concentration is greater than 50 mass %, dispersion becomes difficult and precipitation easily occurs.

The titanium dioxide dispersion is obtained by mixing a titanium source with a dispersion medium in an arbitrary order and stirring thereof. In the case of using titanium alkoxide, titanium acetyl acetate, titanium tetrachloride, and titanium sulfate other than titanium dioxide powders, a chemical reaction is required, and therefore, mixing and stirring are preferably performed in the presence of water. By operating in the presence of water, crystallinity can be improved and a refractive index is further heightened. In addition, an organic acid is preferably mixed after reacting the titanium source with water in order to improve the dispersion stability.

Examples of the organic acid include methanol, ethanol, 2-propanol, n-butanol, 2-butanol, ethyl acetate, acetone, methyl ethyl ketone, and methyl isobutyl ketone, but the organic acid is not particularly limited thereto.

After a mixture of a titanium source with water and/or an organic acid is prepared, for example, a method of removing water or the organic acid by a rotary evaporator and then adding a specific dispersion medium is used to perform replacement with the specific dispersion medium.

The dispersion medium used in the titanium dioxide dispersion preferably has favorable compatibility with a solvent of the polyimide resin solution (X). Examples of the dispersion medium having the compatibility include N,N-dimethylacetamide, N,N-dimethylformamide, N,N,2-trimethylpropionamide, γ-butyrolactone, dimethyl sulfoxide, cyclopentanone, propylene glycol monomethyl ether, and propylene glycol monomethyl ether acetate. In addition, a proportion of the dispersion medium contained in the titanium dioxide dispersion is preferably 50 mass % or greater, more preferably 60 mass % or greater, further more preferably 70 mass % or greater, and particularly preferably 80 mass % or greater.

The polyimide resin composition of the present invention is prepared by mixing the above-mentioned polyimide resin solution (X) with the inorganic particle dispersion (Y) by a known method.

[3. Polyimide Film]

The polyimide resin composition of the present invention can be used for various applications, but exhibits sufficient functions as a polyimide film obtained by removing an organic solvent. Such a polyimide film can be prepared by casting a solution of the polyimide resin composition containing a polyimide resin on a smooth support such as a glass plate, a metal plate, and a plastic film, and removing an organic solvent component by heating. That is, the polyimide film is obtained as a cured product of the polyimide resin composition of the present invention.

As a method of evaporating the organic solvent component by heating, preferred is a method of evaporating an organic solvent at a temperature of 120° C. or lower to prepare a self-supporting film, peeling the self-supporting film from a support, fixing the edge of the self-supporting film, and drying the self-supporting film at a temperature in a range of the boiling point of the used organic solvent or more and 350° C. or less, and thereby preparing a polyimide film. The drying is preferably performed in a nitrogen atmosphere. The pressure in a drying atmosphere may be any of a reduced pressure, a normal pressure, and a pressurization. The thickness of the polyimide film is arbitrarily prepared and not particularly limited, but is preferably 1 to 200 μm, more preferably 1 to 100 μm, and further more preferably 5 to 100 μm.

In addition, from the viewpoint of transparency, a total light transmittance of the polyimide film with a thickness of 1 μm is preferably 75% or greater, more preferably 85% or greater, and further more preferably 90% or greater.

From the viewpoint of a high refractive index, a refractive index nD (refractive index at a wavelength of 589.3 nm) is 1.65 or greater. Since a refractive index of the alicyclic polyimide resin is generally in a range of 1.53 to 1.65, the refractive index nD is preferably 1.65 or greater, more preferably 1.7 or greater, and further more preferably 1.8 or greater, in terms of an effect obtained by combination with titanium dioxide fine particles.

The method of dispersing and mixing the polyimide resin composition of the present invention to prepare a polyimide film is not particularly limited and a known method in the related art can be applied. For example, a method of dispersing and mixing by using a device such as a paint shaker, a dissolver, a ball mill, a bead mill, a sand grind mill, and a planetary centrifugal mixer is exemplified. It is preferable to use glass beads, zirconium beads or the like, particularly in dispersing, to improve dispersibility.

The polyimide resin composition of the present invention has a high refractive index, transparency, and heat resistance, and therefore, can be widely and suitably used in an optical lens of a CCD or CMOS sensor, a sealing material/light extraction layer of LED or organic EL, a reflection preventing film, a color filter, a flexible display, and the like.

According to the polyimide resin composition of the present invention, it is possible to control haze of a polyimide film obtained from the polyimide resin composition while maintaining transparency of the polyimide film by adjusting an average primary particle diameter and/or an average secondary particle diameter (D50) of inorganic particles of the composition.

That is, it is possible to provide a method of controlling haze of the polyimide film while maintaining transparency thereof, by decreasing an average primary particle diameter and/or an average secondary particle diameter (D50) of the inorganic particles of the polyimide resin composition containing an alicyclic polyimide resin having a structural unit represented by the above-mentioned general formula (1) and inorganic particles of at least one selected from the group consisting of titanium dioxide, barium titanate, and zirconium oxide, wherein the alicyclic polyimide resin has a glass transition temperature of 260° C. or higher in order to decrease the haze, and by increasing an average primary particle diameter and/or an average secondary particle diameter (D50) of the inorganic particles in order to increase the haze.

This is based on the knowledge found out by the present inventors that the haze of the polyimide film is increased depending on the size of each of the average primary particle diameter and the average secondary particle diameter (D50) of the inorganic particles in the polyimide resin composition.

EXAMPLES

Hereinafter examples will be described, but the present invention is not limited to the following examples.

Synthesis of an alicyclic polyimide resin, preparation of a titanium dioxide dispersion, and evaluation of performance of a polyimide resin composition were performed by the following methods.

(1) Total Light Transmittance, Haze:

Measurement of a total light transmittance and haze of a polyimide film obtained from a polyimide resin composition was performed by using a color/turbidity simultaneous measurement apparatus (COH400) manufactured by Nippon Denshoku Industries Co., Ltd. based on JIS K7105.

(2) Glass Transition Temperature:

DSC measurement of the synthesized alicyclic polyimide resin was performed in a condition of a temperature rise rate of 10° C./min by using a differential scanning calorimeter (DSC 6200) manufactured by SII Nanotechnology Inc. to obtain a glass transition temperature.

(3) Solid Content Concentration:

The solid content concentrations of the alicyclic polyimide resin solution and the titanium dioxide dispersion were obtained by heating a sample at 300° C.×30 min in a small electric furnace MMF-1 manufactured by Aswan Corporation and then calculating the difference in mass between the sample before heating and the sample after heating.

(4) Film Thickness:

The film thickness of a polyimide film obtained from the polyimide resin composition was, in the case where the thickness was 10 μm or greater, measured by using a micrometer manufactured by Mitsutoyo Corporation. In the case where the thickness was less than 10 μm, the film thickness was measured by using a color 3D laser microscope VX-8710 manufactured by Keynes Co., Ltd.

(5) Refractive Index:

The refractive index of a polyimide film having a thickness of 20 μm obtained from the polyimide resin composition was measured in the condition of D line: 589 nm and a temperature: 23° C. by using an Abbe refractometer DR-M4/1550 manufactured by Atago Co., Ltd. The refractive index measured at D line is designated as nD.

Synthesis Example 1 of Alicyclic Polyimide Resin 12.75 g (0.037 mol) of 1,4-bis(4-amino-α,α-dimethylbenzyl)benzene (manufactured by Mitsui Chemical Fine Co., Ltd.) and 13.63 g (0.037 mol) of 4,4'-bis(4-aminophenoxy)biphenyl (manufactured by Wakayama Seika Kogyo Co., Ltd.) as diamine components, 51.56 g of γ-butyrolactone (manufactured by Mitsubishi Chemical Co., Ltd.) as an organic solvent, and 0.374 g of triethylamine (manufactured by Kanto Chemical Co., Ltd.) as an imidization catalyst were put into a 300-mL five-neck round-bottom flask equipped with a stainless-steel half-moon stirring blade, a nitrogen-introducing duct, a Dean Stark with a cooling tube, a thermometer, and a glass end cap, and were stirred at a system temperature of 70° C. and a revolution rate of 200 rpm in a nitrogen atmosphere to obtain a solution. 16.59 g (0.074 mol) of 1,2,4,5-cyclohexanetetracarboxylic dianhydride (manufactured by Mitsubishi Gas Chemical Company) as an alicyclic tetracarboxylic acid component and 12.89 g of N,N-dimethylacetamide (manufactured by Mitsubishi Gas Chemical Company) which is an organic solvent were added thereto all at a time, and heating was performed using a mantle heater over approximately 20 minutes to raise the temperature in the reaction system to 180° C. Distilled components were captured, the temperature in the reaction system was maintained at 180° C. while adjusting the revolution rate in accordance with the increase in viscosity, and thus, reflux was performed for 5 hours to obtain a polyimide solution. Then, after the temperature in the reaction system was cooled to 120° C., 96.75 g of N,N-dimethylacetamide (manufactured by Mitsubishi Gas Chemical Company) was added thereto and stirring was further performed for approximately 3 hours for homogenization to obtain a polyimide resin solution (A) having a solid content concentration of 20 mass %.

Subsequently, the obtained polyimide resin solution was applied onto a glass plate and held on a hot plate at 100° C. for 60 minutes to evaporate the solvent, and thereby a colorless transparent primary dried film having self-supporting characteristics was obtained. Then, the film was fixed on a stainless frame and heated in a hot air dryer at 250° C. for 2 hours to evaporate the solvent, thereby obtaining a film having a thickness of 30 µm. The obtained film was subjected to FT-IR analysis to confirm loss of a raw material peak and appearance of a peak derived from imide skeletons. In addition, the refractive index nD of the film was 1.619, and the glass transition temperature of the film was 303° C.

Synthesis Example 2 of Alicyclic Polyimide Resin 19.05 g (0.055 mol) of 1,4-bis(4-amino-α,α-dimethylbenzyl)benzene (manufactured by Mitsui Chemical Fine Co., Ltd.), 6.31 g (0.024 mol) of amino-1,3,3-trimethyl-1-(4-aminophenyl)-indane (manufactured by Nihon Pharmaceutical Co., Ltd., a mixture of 5-amino body (47 mol %) and 6-amino body (53 mol %)) as diamine components, 42.12 g of γ-butyrolactone (manufactured by Mitsubishi Chemical Co., Ltd.) as an organic solvent, and 4.0 g of triethylamine (manufactured by Kanto Chemical Co., Ltd.) and 0.018 g of 1,4-diazabicyclo[2. 2. 2]octane (manufactured by Tokyo Kasei Co., Ltd.) as imidization catalysts were put into the same 300-mL five-neck round-bottom flask as the flask used in Synthesis Example 1, and were stirred at a system temperature of 70° C. and a revolution rate of 200 rpm in a nitrogen atmosphere to obtain a solution. 17.71 g (0.079 mol) of 1,2,4,5-cyclohexanetetracarboxylic dianhydride (manufactured by Mitsubishi Gas Chemical Company) as an alicyclic tetracarboxylic acid component and 10.53 g of γ-butyrolactone were added thereto all at a time, and heating was performed using a mantle heater over approximately 20 minutes to raise the temperature in the reaction system to 190° C. Distilled components were captured, the temperature in the reaction system was maintained at 190° C. while adjusting the revolution rate in accordance with the increase in viscosity, and thus, reflux was performed for 5 hours to obtain a polyimide solution. Then, after the temperature in the reaction system was cooled to 120° C., 108.26 g of N,N-dimethylacetamide (manufactured by Mitsubishi Gas Chemical Company) was added thereto and stirring was further performed for approximately 3 hours for homogenization to obtain a polyimide resin solution (B) having a solid content concentration of 20 mass %.

Subsequently, the obtained polyimide resin solution was applied onto a glass plate and held on a hot plate at 100° C. for 60 minutes to evaporate the solvent, and thereby a colorless transparent primary dried film having self-supporting characteristics was obtained. Then, the film was fixed on a stainless frame and heated in a hot air dryer at 250° C. for 2 hours to evaporate the solvent, thereby obtaining a film having a thickness of 30 µm. The obtained film was subjected to FT-IR analysis to confirm loss of a raw material peak and appearance of a peak derived from imide skeletons. In addition, the refractive index nD of the film was 1.597, and the glass transition temperature of the film was 320° C.

Synthesis Example 3 of Alicyclic Polyimide Resin 20.04 g (0.094 mol) of 2,2'-dimethylbenzidine (manufactured by Wakayama Seika Kogyo Co., Ltd.) and 7.56 g (0.024 mol) of 2,2'-bis(trifluoromethyl)benzidine (manufactured by Wakayama Seika Kogyo Co., Ltd.) as diamine components, 52.85 g of γ-butyrolactone (manufactured by Mitsubishi Chemical Co., Ltd.) as an organic solvent, and 6.00 g of triethylamine (manufactured by Kanto Chemical Co., Ltd.) as an imidization catalyst were put into the same 2-L glass five-neck round-bottom flask as the flask used in Synthesis Example 1, and were stirred at a system temperature of 70° C. and a revolution rate of 200 rpm in a nitrogen atmosphere to obtain a solution. 26.45 g (0.118 mol) of 1,2,4,5-cyclohexanetetracarboxylic dianhydride (manufactured by Mitsubishi Gas Chemical Company) as an alicyclic tetracarboxylic acid component and 13.26 g of N,N-dimethylacetamide (manufactured by Mitsubishi Gas Chemical Company) which is an organic solvent were added thereto all at a time, and heating was performed using a mantle heater over approximately 20 minutes to raise the temperature in the reaction system to 190° C. Distilled components were captured, the temperature in the reaction system was maintained at 190° C. while adjusting the revolution rate in accordance with the increase in viscosity, and thus, reflux was performed for 5 hours to obtain a polyimide solution. Then, after the temperature in the reaction system was cooled to 120° C., 133.13 g of N,N-dimethylacetamide (manufactured by Mitsubishi Gas Chemical Company) was added thereto and stirring was further performed for approximately 3 hours for homogenization to obtain a polyimide resin solution (C) having a solid content concentration of 20 mass %.

Subsequently, the obtained polyimide resin solution was applied onto a glass plate and held on a hot plate at 100° C. for 60 minutes to evaporate the solvent, and thereby a colorless transparent primary dried film having self-supporting characteristics was obtained. Then, the film was fixed on a stainless frame and heated in a hot air dryer at 250° C. for 2 hours to evaporate the solvent, thereby obtaining a film having a thickness of 30 µm. The obtained film was subjected to FT-IR analysis to confirm loss of a raw material peak and appearance of a peak derived from imide skeletons. In addition, the refractive index nD of the film was 1.597, and the glass transition temperature of the film was 397° C.

Preparation Example 1 of Titanium Dioxide Dispersion 850 g of titanium dioxide powders (S-TAF 1500 Series (manufactured by Fuji Titanium Industry Co., Ltd., average primary particle diameter: 20 to 30 nm)), 85 g of a pigment dispersant (DISPALON: DA325 (manufactured by Kusumoto Kasei Co., Ltd.)), and 3,850 g of GBL (manufactured by Mitsubishi Chemical Co., Ltd.) were mixed. The mixture was dispersed for 1 hour and 15 minutes by using a bead mill (manufactured by Nippon Coke & Engineering Co., Ltd., MSC mill) to obtain a titanium dioxide fine particle dispersion 1 having a solid content concentration of 18 mass %. The particle diameter distribution was measured by sampling some of the dispersion, thereby confirming that an average secondary particle diameter (D50) was 152.7 nm and a sufficiently homogeneous dispersion was obtained.

Preparation Example 2 of Titanium Dioxide Dispersion 850 g of titanium dioxide powders (S-TAF 1500 Series (manufactured by Fuji Titanium Industry Co., Ltd., average primary particle diameter: 20 to 30 nm)), 85 g of a pigment dispersant (DISPALON: DA325 (manufactured by Kusumoto Kasei Co., Ltd.)), and 3,850 g of GBL (manufactured by Mitsubishi Chemical Co., Ltd.) were mixed. The mixture was dispersed for 11 hours by using a bead mill (manufactured by Nippon Coke & Engineering Co., Ltd., MSC mill) to obtain a titanium dioxide fine particle dispersion 2 having a solid content concentration of 18 mass %. The particle diameter distribution was measured by sampling some of the dispersion, thereby confirming that an average secondary particle diameter (D50) was 38.9 nm and a sufficiently homogeneous dispersion was obtained.

Preparation Example 3 of Titanium Dioxide Dispersion 850 g of titanium dioxide powders (TTO-55 Series (manufactured by Ishihara Sangyo Kaisha Ltd., average primary particle diameter: 30 to 35 nm)), 255 g of a pigment dispersant (DISPALON: DA325 (manufactured by Kusumoto Kasei Co., Ltd.)), and 3,850 g of GBL (manufactured by Mitsubishi Chemical Co., Ltd.) were mixed. The mixture was dispersed for 1 hour by using a bead mill (manufactured by Nippon Coke & Engineering Co., Ltd., MSC mill) to obtain a titanium dioxide fine particle dispersion 3 having a solid content concentration of 17 mass %. The particle diameter distribution was measured by sampling some of the dispersion, thereby confirming that an average secondary particle diameter (D50) was 153.0 nm and a sufficiently homogeneous dispersion was obtained.

Preparation Example 4 of Titanium Dioxide Dispersion 9 g of titanium dioxide powders (TTO-55 Series (manufactured by Ishihara Sangyo Kaisha Ltd., average primary particle diameter: 30 to 35 nm)), 2.7 g of a pigment dispersant (DISPALON: DA325 (manufactured by Kusumoto Kasei Co., Ltd.)), 50 g of zirconia beads (4) 0.3 mm (manufactured by Nikkato Co., Ltd.) and 41 g of GBL (manufactured by Mitsubishi Chemical Co., Ltd.) were mixed. The mixture was dispersed for 3 hours by using a paint shaker (manufactured by Red Devil Inc.) to obtain a titanium dioxide fine particle dispersion 4 having a solid content concentration of 17 mass %. The particle diameter distribution was measured by sampling some of the dispersion, thereby confirming that an average secondary particle diameter (D50) was 155.0 nm and a sufficiently homogeneous dispersion was obtained.

Next, preparation examples of a polyimide resin composition are shown as examples.

A titanium dioxide dispersion 5 was prepared by dispersing titanium dioxide powders (average primary particle diameter: 20 to 50 nm) in a dispersion medium (DMAc) such that a solid content concentration was 30 mass %. The average secondary particle diameter (D50) was 150 to 200 nm.

In addition, a titanium dioxide dispersion 6 was prepared by dispersing titanium dioxide powders (average primary particle diameter: 100 nm) in a dispersion medium (GBL) such that a solid content concentration was 22.5 mass %. The average secondary particle diameter (D50) was 187 nm.

Moreover, a titanium dioxide dispersion 7 was prepared by dispersing titanium dioxide powders (average primary particle diameter: 50 nm) in a dispersion medium (GBL) such that a solid content concentration was 23.3 mass %. The average secondary particle diameter (D50) was 50 nm.

Example 1

50 g of the polyimide resin solution (A) (solid component of 20 mass %) synthesized in Synthesis Example 1 and 50 g of GBL (manufactured by Mitsubishi Chemical Co., Ltd.) were put into a 300-ml four-neck round-bottom flask equipped with a stainless steel half-moon stirring blade, a nitrogen-introducing duct, a thermometer, and a glass end cap, and were stirred at a system temperature of 40° C. and a revolution rate of 200 rpm in a nitrogen atmosphere to obtain a diluted polyimide resin solution (A') (solid content concentration of 10 mass %). Next, 40 g of the diluted polyimide resin solution (A') (solid content concentration of 10 mass %) and 33.3 g of the titanium dioxide dispersion 1 (solid component of 18 mass %) prepared in Preparation Example 1 were kneaded for 5 minutes at a revolution rate of 2,000 rpm by using T. K. HOMODISPER Model 2.5 (manufactured by Primix Corporation). The mixture obtained in this manner was applied on a glass substrate by spin coating.

Then, the glass substrate coated with the mixture was put into a hot air dryer and treated at 60° C. for 10 minutes. Heating was performed in the hot air dryer at 250° C. for 2 hours to evaporate the organic solvent, thereby obtaining a polyimide film having a thickness of 1 μm. The haze value of the polyimide film was 4% and the total light transmittance of the polyimide film was 94%.

In addition, the obtained mixture was applied onto a glass plate, and heated stepwise at 50° C. for 5 minutes, at 80° C. for 5 minutes, and at 135° C. for 5 minutes in the hot air dryer to obtain a primary dried film having self-supporting characteristics. Then, the film was fixed on a stainless frame and heated in the hot air dryer at 250° C. for 2 hours to evaporate the organic solvent, thereby obtaining a polyimide film having a thickness of 20 μm. The haze value of the polyimide film was 30%, the total light transmittance of the polyimide film was 69%, and the refractive index of the polyimide film was 1.87.

Example 2

50 g of the polyimide resin solution (A) (solid component of 20 mass %) synthesized in Synthesis Example 1 and 50 g of GBL (manufactured by Mitsubishi Chemical Co., Ltd.) were put into a 300-ml four-neck round-bottom flask equipped with a stainless-steel half-moon stirring blade, a nitrogen-introducing duct, a thermometer, and a glass end cap, which was the same as used in Example 1, and were stirred at a system temperature of 40° C. and a revolution rate of 200 rpm in a nitrogen atmosphere to obtain a diluted polyimide resin solution (A') (solid content concentration of 10 mass %). Next, 40 g of the diluted polyimide resin solution (A') (solid content concentration of 10 mass %) and 33.3 g of the titanium dioxide dispersion 2 (solid component of 18 mass %) prepared in Preparation Example 2 were kneaded for 5 minutes at a revolution rate of 2,000 rpm by using T. K. HOMODISPER Model 2.5 (manufactured by Primix Corporation). The mixture obtained in this manner was applied on a glass substrate by spin coating.

Then, the glass substrate coated with the mixture was put into a hot air dryer and treated at 60° C. for 10 minutes. Heating was performed in the hot air dryer at 250° C. for 2 hours to evaporate the organic solvent, thereby obtaining a polyimide film having a thickness of 1 μm. The haze value of the polyimide film was 1% and the total light transmittance of the polyimide film was 94%.

In addition, the obtained mixture was applied onto a glass plate, and heated stepwise at 50° C. for 5 minutes, at 80° C. for 5 minutes, and at 135° C. for 5 minutes in the hot air dryer to obtain a primary dried film having self-supporting characteristics. Then, the film was fixed on a stainless frame and heated in the hot air dryer at 250° C. for 2 hours to evaporate the organic solvent, thereby obtaining a polyimide film having a thickness of 20 μm. The haze value of the polyimide film was 7%, the total light transmittance of the polyimide film was 71%, and the refractive index of the polyimide film was 1.87.

Example 3

50 g of the polyimide resin solution (A) (solid component of 20 mass %) synthesized in Synthesis Example 1 and 50 g of GBL (manufactured by Mitsubishi Chemical Co., Ltd.) were put into a 300-ml four-neck round-bottom flask equipped with a stainless-steel half-moon stirring blade, a nitrogen-introducing duct, a thermometer, and a glass end cap, which was the same as used in Example 1, and were stirred at a system temperature of 40° C. and a revolution rate of 200 rpm in a nitrogen atmosphere to obtain a diluted polyimide resin solution (A') (solid content concentration of 10 mass %). Next, 40 g of the diluted polyimide resin solution (A') (solid content concentration of 10 mass %) and 35.1 g of the titanium dioxide dispersion 3 (solid component of 17 mass %) prepared in Preparation Example 3 were kneaded for 5 minutes at a revolution rate of 2,000 rpm by using T. K. HOMODISPER Model 2.5 (manufactured by Primix Corporation). The mixture obtained in this manner was applied on a glass substrate by spin coating.

Then, the glass substrate coated with the mixture was put into a hot air dryer and treated at 60° C. for 10 minutes. Heating was performed in the hot air dryer at 250° C. for 2 hours to evaporate the organic solvent, thereby obtaining a polyimide film having a thickness of 1 μm. The haze value of the polyimide film was 29% and the total light transmittance of the polyimide film was 79%.

In addition, the obtained mixture was applied onto a glass plate, and heated stepwise at 50° C. for 5 minutes, at 80° C. for 5 minutes, and at 135° C. for 5 minutes in the hot air dryer to obtain a primary dried film having self-supporting characteristics. Then, the film was fixed on a stainless frame and heated in the hot air dryer at 250° C. for 2 hours to evaporate the organic solvent, thereby obtaining a polyimide film having a thickness of 20 μm. The haze value of the polyimide film was 85%, the total light transmittance of the polyimide film was 52%, and the refractive index of the polyimide film was 1.85.

Example 4

50 g of the polyimide resin solution (A) (solid component of 20 mass %) synthesized in Synthesis Example 1 and 50 g of GBL (manufactured by Mitsubishi Chemical Co., Ltd.) were put into a 300-ml four-neck round-bottom flask equipped with a stainless-steel half-moon stirring blade, a nitrogen-introducing duct, a thermometer, and a glass end cap, which was the same as used in Example 1, and were stirred at a system temperature of 40° C. and a revolution rate of 200 rpm in a nitrogen atmosphere to obtain a diluted polyimide resin solution (A') (solid content concentration of 10 mass %). Next, 40 g of the diluted polyimide resin solution (A') (solid content concentration of 10 mass %) and 20 g of the titanium dioxide dispersion 5 were kneaded for 5 minutes at a revolution rate of 2,000 rpm by using T. K. HOMODISPER Model 2.5 (manufactured by Primix Corporation). The mixture obtained in this manner was applied on a glass substrate by spin coating.

Then, the glass substrate coated with the mixture was put into a hot air dryer and treated at 60° C. for 10 minutes. Heating was performed in the hot air dryer at 250° C. for 2 hours to evaporate the organic solvent, thereby obtaining a polyimide film having a thickness of 1 μm. The haze value of the polyimide film was 30% and the total light transmittance of the polyimide film was 91%.

In addition, the obtained mixture was applied on a glass plate, and heated stepwise at 50° C. for 5 minutes, at 80° C. for 5 minutes, and at 135° C. for 5 minutes in the hot air dryer to obtain a primary dried film having self-supporting characteristics. Then, the film was fixed on a stainless frame and heated in the hot air dryer at 250° C. for 2 hours to evaporate the organic solvent, thereby obtaining a polyimide film having a thickness of 20 μm. The refractive index of the polyimide film was 1.85.

Example 5

50 g of the polyimide resin solution (A) (solid component of 20 mass %) synthesized in Synthesis Example 1 and 50 g of GBL (manufactured by Mitsubishi Chemical Co., Ltd.) were put into a 300-ml four-neck round-bottom flask equipped with a stainless-steel half-moon stirring blade, a nitrogen-introducing duct, a thermometer, and a glass end cap, which was the same as used in Example 1, and were stirred at a system temperature of 40° C. and a revolution rate of 200 rpm in a nitrogen atmosphere to obtain a diluted polyimide resin solution (A') (solid content concentration of 10 mass %). Next, 40 g of the diluted polyimide resin solution (A') (solid content concentration of 10 mass %) and 20 g of the titanium dioxide dispersion 6 were kneaded for 5 minutes at a revolution rate of 2,000 rpm by using T. K. HOMODISPER Model 2.5 (manufactured by Primix Corporation). The mixture obtained in this manner was applied on a glass substrate by spin coating.

Then, the glass substrate coated with the mixture was put into a hot air dryer and treated at 60° C. for 10 minutes. Heating was performed in the hot air dryer at 250° C. for 2 hours to evaporate the organic solvent, thereby obtaining a polyimide film having a thickness of 1 μm. The haze value of the polyimide film was 31% and the total light transmittance of the polyimide film was 58%.

In addition, the obtained mixture was applied on the glass plate, and heated stepwise at 50° C. for 5 minutes, at 80° C. for 5 minutes, and at 135° C. for 5 minutes in the hot air dryer to obtain a primary dried film having self-supporting characteristics. Then, the film was fixed on a stainless frame and heated in the hot air dryer at 250° C. for 2 hours to evaporate the organic solvent, thereby obtaining a polyimide film having a thickness of 20 µm. The refractive index of the polyimide film was 1.85.

Example 6

50 g of the polyimide resin solution (A) (solid component of 20 mass %) synthesized in Synthesis Example 1 and 50 g of GBL (manufactured by Mitsubishi Chemical Co., Ltd.) were put into a 300-ml four-neck round-bottom flask equipped with a stainless-steel half-moon stirring blade, a nitrogen-introducing duct, a thermometer, and a glass end cap, which was the same as used in Example 1, and were stirred at a system temperature of 40° C. and a revolution rate of 200 rpm in a nitrogen atmosphere to obtain a diluted polyimide resin solution (A') (solid content concentration of 10 mass %). Next, 40 g of the diluted polyimide resin solution (A') (solid content concentration of 10 mass %) and 20 g of the titanium dioxide dispersion 7 were kneaded for 5 minutes at a revolution rate of 2,000 rpm by using T. K. HOMODISPER Model 2.5 (manufactured by Primix Corporation). The mixture obtained in this manner was applied on a glass substrate by spin coating.

Then, the glass substrate coated with the mixture was put into a hot air dryer and treated at 60° C. for 10 minutes. Heating was performed in the hot air dryer at 250° C. for 2 hours to evaporate the organic solvent, thereby obtaining a polyimide film having a thickness of 1 µm. The haze value of the polyimide film was 1% and the total light transmittance of the polyimide film was 95%.

In addition, the obtained mixture was applied onto a glass plate, and heated stepwise at 50° C. for 5 minutes, at 80° C. for 5 minutes, and at 135° C. for 5 minutes in the hot air dryer to obtain a primary dried film having self-supporting characteristics. Then, the film was fixed on a stainless frame and heated in the hot air dryer at 250° C. for 2 hours to evaporate the organic solvent, thereby obtaining a polyimide film having a thickness of 20 µm. The refractive index of the polyimide film was 1.86.

Example 7

50 g of the polyimide resin solution (B) (solid component of 20 mass %) synthesized in Synthesis Example 2 and 50 g of GBL (manufactured by Mitsubishi Chemical Co., Ltd.) were put into a 300-ml four-neck round-bottom flask equipped with a stainless-steel half-moon stirring blade, a nitrogen-introducing duct, a thermometer, and a glass end cap, which was the same as used in Example 1, and were stirred at a system temperature of 40° C. and a revolution rate of 200 rpm in a nitrogen atmosphere to obtain a diluted polyimide resin solution (B') (solid content concentration of 10 mass %). Next, 40 g of the diluted polyimide resin solution (B') (solid content concentration of 10 mass %) and 35.1 g of the titanium dioxide dispersion 3 (solid component of 17 mass %) were kneaded for 5 minutes at a revolution rate of 2,000 rpm by using T. K. HOMODISPER Model 2.5 (manufactured by Primix Corporation). The mixture obtained in this manner was applied on a glass substrate by spin coating.

Then, the glass substrate coated with the mixture was put into a hot air dryer and treated at 60° C. for 10 minutes. Heating was performed in the hot air dryer at 250° C. for 2 hours to evaporate the organic solvent, thereby obtaining a polyimide film having a thickness of 1 µm. The haze value of the polyimide film was 76% and the total light transmittance of the polyimide film was 84%.

In addition, the obtained mixture was applied on a glass plate, and heated stepwise at 50° C. for 5 minutes, at 80° C. for 5 minutes, and at 135° C. for 5 minutes in the hot air dryer to obtain a primary dried film having self-supporting characteristics. Then, the film was fixed on a stainless frame and heated in the hot air dryer at 250° C. for 2 hours to evaporate the organic solvent, thereby obtaining a polyimide film having a thickness of 20 µm. The refractive index of the polyimide film was 1.85.

Example 8

50 g of the polyimide resin solution (C) (solid component of 20 mass %) synthesized in Synthesis Example 3 and 50 g of GBL (manufactured by Mitsubishi Chemical Co., Ltd.) were put into a 300-ml four-neck round-bottom flask equipped with a stainless-steel half-moon stirring blade, a nitrogen-introducing duct, a thermometer, and a glass end cap, which was the same as used in Example 1, and were stirred at a system temperature of 40° C. and a revolution rate of 200 rpm in a nitrogen atmosphere to obtain a diluted polyimide resin solution (C') (solid content concentration of 10 mass %). Next, 40 g of the diluted polyimide resin solution (C') (solid content concentration of 10 mass %) and 35.1 g of the titanium dioxide dispersion 3 (solid component of 17 mass %) were kneaded for 5 minutes at a revolution rate of 2,000 rpm by using T. K. HOMODISPER Model 2.5 (manufactured by Primix Corporation). The mixture obtained in this manner was applied on a glass substrate by spin coating.

Then, the glass substrate coated with the mixture was put into a hot air dryer and treated at 60° C. for 10 minutes. Heating was performed in the hot air dryer at 250° C. for 2 hours to evaporate the organic solvent, thereby obtaining a polyimide film having a thickness of 1 µm. The haze value of the polyimide film was 67% and the total light transmittance of the polyimide film was 75%.

In addition, the obtained mixture was applied onto a glass plate, and heated stepwise at 50° C. for 5 minutes, at 80° C. for 5 minutes, and at 135° C. for 5 minutes in the hot air dryer to obtain a primary dried film having self-supporting characteristics. Then, the film was fixed on a stainless frame and heated at 250° C. for 2 hours in the hot air dryer to evaporate the organic solvent, thereby obtaining a polyimide film having a thickness of 20 µm. The refractive index of the polyimide film was 1.85.

Example 9

50 g of the polyimide resin solution (A) (solid component of 20 mass %) synthesized in Synthesis Example 1 and 50 g of GBL (manufactured by Mitsubishi Chemical Co., Ltd.) were put into a 300-ml four-neck round-bottom flask equipped with a stainless-steel half-moon stirring blade, a nitrogen-introducing duct, a thermometer, and a glass end cap, which was the same as used in Example 1, and were stirred at a system temperature of 40° C. and a revolution rate of 200 rpm in a nitrogen atmosphere to obtain a diluted polyimide resin solution (A') (solid content concentration of 10 mass %). Next, 40 g of the diluted polyimide resin solution (A') (solid content concentration of 10 mass %) and 35.1 g of the titanium dioxide dispersion 4 (solid component of 17 mass %) prepared in Preparation Example 4 were kneaded for 5 minutes at a revolution rate of 2,000 rpm by using T. K. HOMODISPER Model 2.5 (manufactured by Primix Corporation). The mixture obtained in this manner was applied on a glass substrate by spin coating.

Then, the glass substrate coated with the mixture was put into a hot air dryer and treated at 60° C. for 10 minutes. Heating was performed in the hot air dryer at 250° C. for 2 hours to evaporate the organic solvent, thereby obtaining a polyimide film having a thickness of 1 μm. The haze value of the polyimide film was 36% and the total light transmittance of the polyimide film was 88%.

In addition, the obtained mixture was applied onto a glass plate, and heated stepwise at 50° C. for 5 minutes, at 80° C. for 5 minutes, and at 135° C. for 5 minutes in the hot air dryer to obtain a primary dried film having self-supporting characteristics. Then, the film was fixed on a stainless frame and heated in the hot air dryer at 250° C. for 2 hours to evaporate the organic solvent, thereby obtaining a polyimide film having a thickness of 20 μm. The refractive index of the polyimide film was 1.85.

TABLE 1

|  | Example 1 | Example 2 | Example 3 | Example 4 | Example 5 | Example 6 | Example 7 | Example 8 | Example 9 |
|---|---|---|---|---|---|---|---|---|---|
| Titanium oxide particle content (mass %) | 60 | 60 | 60 | 60 | 60 | 60 | 60 | 60 | 60 |
| Film thickness (μm) | 1 | 20 | 1 | 20 | 1 | 20 | 1 | 1 | 1 | 1 | 1 |
| Total light transmittance (%) | 94 | 69 | 94 | 71 | 79 | 52 | 91 | 58 | 95 | 84 | 75 | 88 |
| Haze (%) | 4 | 30 | 1 | 7 | 29 | 85 | 30 | 31 | 1 | 76 | 67 | 36 |
| Refractive index | 1.87 | 1.87 | 1.85 | 1.85 | 1.85 | 1.86 | 1.85 | 1.85 | 1.85 |

The invention claimed is:

1. A polyimide resin composition comprising:
   an alicyclic polyimide resin having a structural unit represented by the following formula (1)

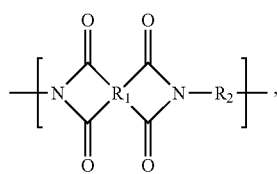

(1)

wherein $R_1$ represents a tetravalent alicyclic hydrocarbon group having a carbon number of from 4 to 22, and $R_2$ represents a divalent aliphatic hydrocarbon group having a carbon number of from 2 to 28 and/or a divalent aromatic hydrocarbon group having a carbon number of from 6 to 27; and
   inorganic particles of at least one selected from the group consisting of titanium dioxide, barium titanate, and zirconium oxide,
   wherein the alicyclic polyimide resin has a glass transition temperature of 260° C. or higher, and
   wherein a polyimide film with a thickness of 1 μm of the polyimide resin composition has a total light transmittance of 75% or greater.

2. The polyimide resin composition according to claim 1, wherein a tetracarboxylic acid component of the alicyclic polyimide resin is derived from a tetracarboxylic acid selected from the group consisting of 1,2,3,4-cyclobutanetetracarboxylic acid, 1,2,4,5-cyclopentanetetracarboxylic acid, 1,2,4,5-cyclohexanetetracarboxylic acid, bicyclo[2.2.2]octa-7-en-2,3,5,6-tetracarboxylic acid, dicyclohexyltetracarboxylic acid, and regioisomers thereof.

3. The polyimide resin composition according to claim 1, wherein the alicyclic polyimide resin is a polyimide resin having a repeating structural unit represented by the following formula (2):

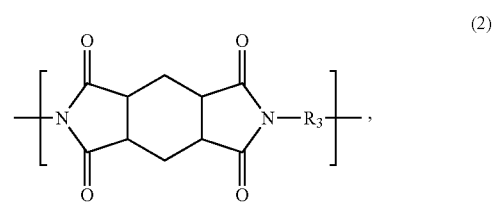

(2)

wherein $R_3$ represents a divalent aliphatic hydrocarbon group having a carbon number of from 2 to 28 and/or a divalent aromatic hydrocarbon group having a carbon number of from 6 to 27.

4. The polyimide resin composition according to claim 1, wherein a diamine component of the alicyclic polyimide resin is derived from a diamine selected from the group consisting of 1,4-bis(4-amino-α,α-dimethylbenzyl)benzene, 4,4'-bis(4-aminophenoxy)biphenyl, 5-amino-1,3,3-trimethyl-1-(4-aminophenyl)-indane, 6-amino-1,3,3-trimethyl-1-(4-aminophenyl)-indane, 2,2'-dimethylbenzidine, and 2,2'-bis(trifluoromethyl)benzidine.

5. A method for producing a polyimide resin composition, comprising:
   mixing a polyimide resin solution containing an alicyclic polyimide resin having a structural unit represented by the following formula (1)

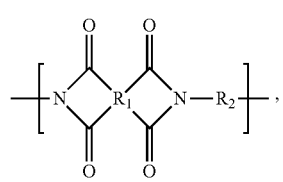

(1)

wherein $R_1$ represents a tetravalent alicyclic hydrocarbon group having a carbon number of from 4 to 22, and $R_2$ represents a divalent aliphatic hydrocarbon group having a carbon number of from 2 to 28 and/or a divalent aromatic hydrocarbon group having a carbon number of from 6 to 27,
    with an inorganic particle dispersion containing inorganic particles of at least one selected from the group consisting of titanium dioxide, barium titanate, and zirconium oxide,
    wherein the inorganic particle dispersion has a solid content concentration of 10 to 50 mass %, and
    wherein a polyimide film with a thickness of 1 μm of the polyimide resin composition has a total light transmittance of 75% or greater.

6. The method for producing a polyimide resin composition according to claim 5,
    wherein a solvent of the polyimide resin solution is one or more selected from the group consisting of N-methyl-2-pyrrolidone, N,N-dimethylacetamide, γ-butyrolactone, N,N-dimethylformamide, dimethyl sulfoxide, hexamethylphosphoramide, tetramethylene sulfone, p-chlorophenol, m-cresol, 2-chloro-4-hydroxytoluene, and 1,3-dioxolane.

7. The method for producing a polyimide resin composition according to claim 5,
    wherein a dispersion medium of the inorganic particle dispersion contains any one selected from the group consisting of N,N-dimethylacetamide, N,N-dimethylformamide, N,N,2-trimethylpropionamide, γ-butyrolactone, dimethyl sulfoxide, cyclopentanone, propylene glycol monomethyl ether, and propylene glycol monomethyl ether acetate, and
    a proportion of the dispersion medium in the dispersion is 60 mass % or greater.

8. A polyimide film, composed of a cured product of the polyimide resin composition according to claim 1.

\* \* \* \* \*